United States Patent [19]

Kroninger et al.

[11] Patent Number: 5,042,135
[45] Date of Patent: Aug. 27, 1991

[54] METHOD OF INSTALLING FRICTION CLUTCHES IN MOTOR VEHICLES

[75] Inventors: Oswald Kroninger, Ottersweier; Egon Zapf, Bühlertal, both of Fed. Rep. of Germany

[73] Assignee: Luk Lamellen Und Kupplungsbau GmbH, Buhl, Fed. Rep. of Germany

[21] Appl. No.: 451,338

[22] Filed: Dec. 15, 1989

[30] Foreign Application Priority Data

Dec. 15, 1988 [DE] Fed. Rep. of Germany ....... 3842207

[51] Int. Cl.⁵ .............................................. B23Q 3/00
[52] U.S. Cl. ....................................... 29/467; 29/468; 29/274; 29/464
[58] Field of Search .................. 29/467, 468, 274, 464

[56] References Cited

U.S. PATENT DOCUMENTS

| 1,935,678 | 11/1933 | Valpey | 29/274 |
| 1,941,022 | 12/1933 | Shelley | 29/274 |
| 1,986,156 | 1/1935 | Nelson | 29/274 |
| 2,487,504 | 11/1949 | Yelkin | 29/274 |
| 3,590,461 | 7/1971 | Siler | 29/464 |
| 4,076,131 | 2/1978 | Dahlstrom et al. | 901/41 |
| 4,255,839 | 3/1981 | Shea | 29/274 |

FOREIGN PATENT DOCUMENTS 2110427 6/1983 United Kingdom ................. 901/41

Primary Examiner—P. W. Echols
Assistant Examiner—David P. Bryant
Attorney, Agent, or Firm—Peter K. Kontler

[57] ABSTRACT

The clutch plate and the housing (including the cover and a diaphragm spring in the cover) of a friction clutch are centered relative to each other and are held at a selected axial distance from each other on first and second centering portions of a mounting tool which has a handle at one end and the other end of which is insertable into an axial recess of the output element of an engine. The cover is centered on and is fastened to a flywheel of the output element before the tool is extracted from the output element, thereupon the clutch plate and ultimately from the housing. The tool is provided with a movable holding portion which maintains the tips of prongs forming part of the diaphragm spring in abutment with a locating portion of the tool to thus maintian the tips in a selected axial position. The holding portion can be disengaged from and can be moved through the splined hub of the clutch plate in response to angular and/or other movement relative to at least one of the centering portions.

7 Claims, 5 Drawing Sheets

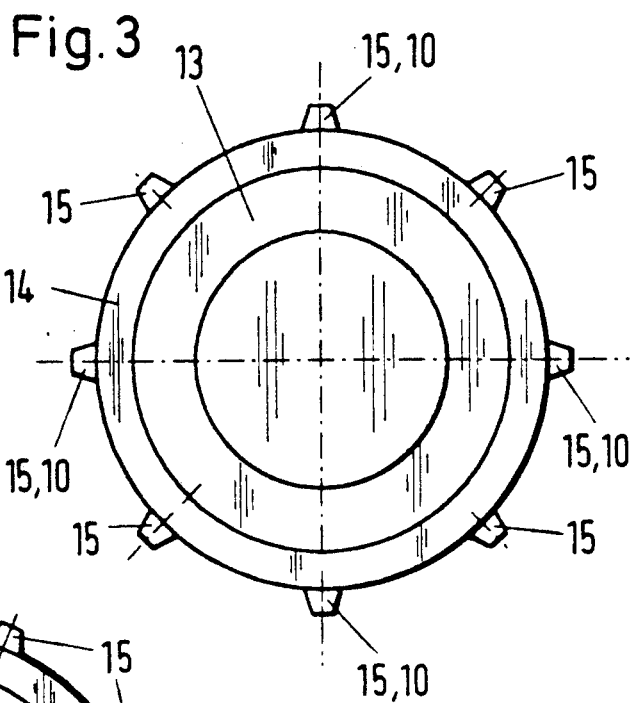
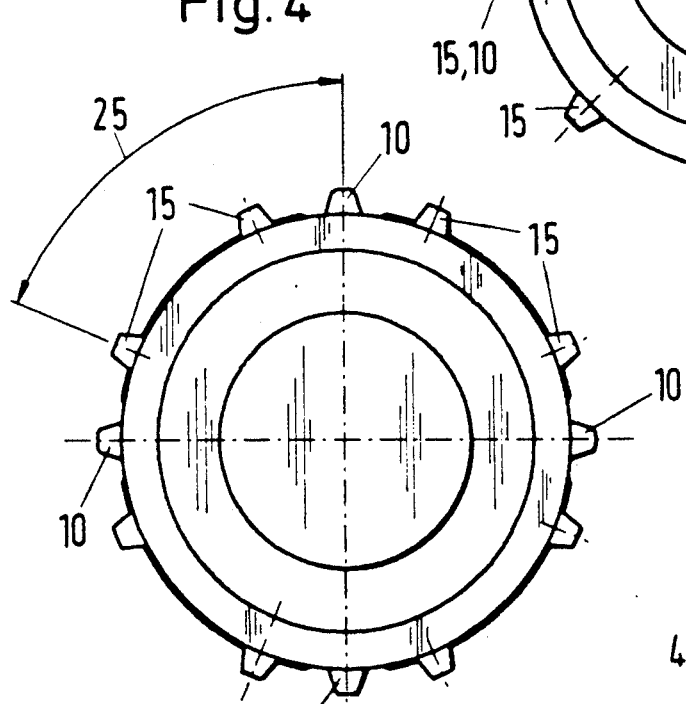
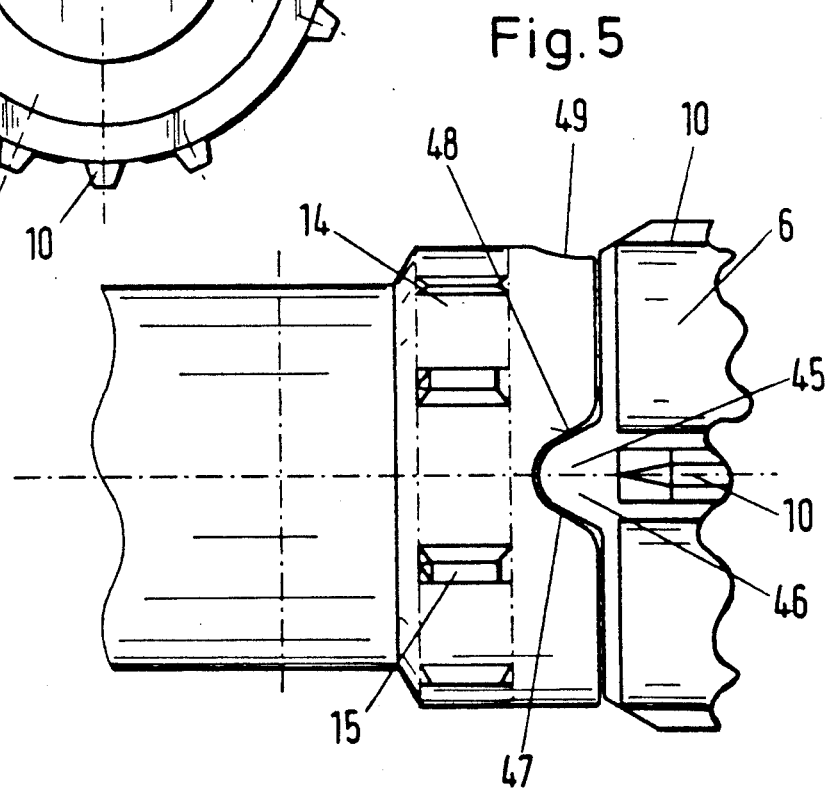

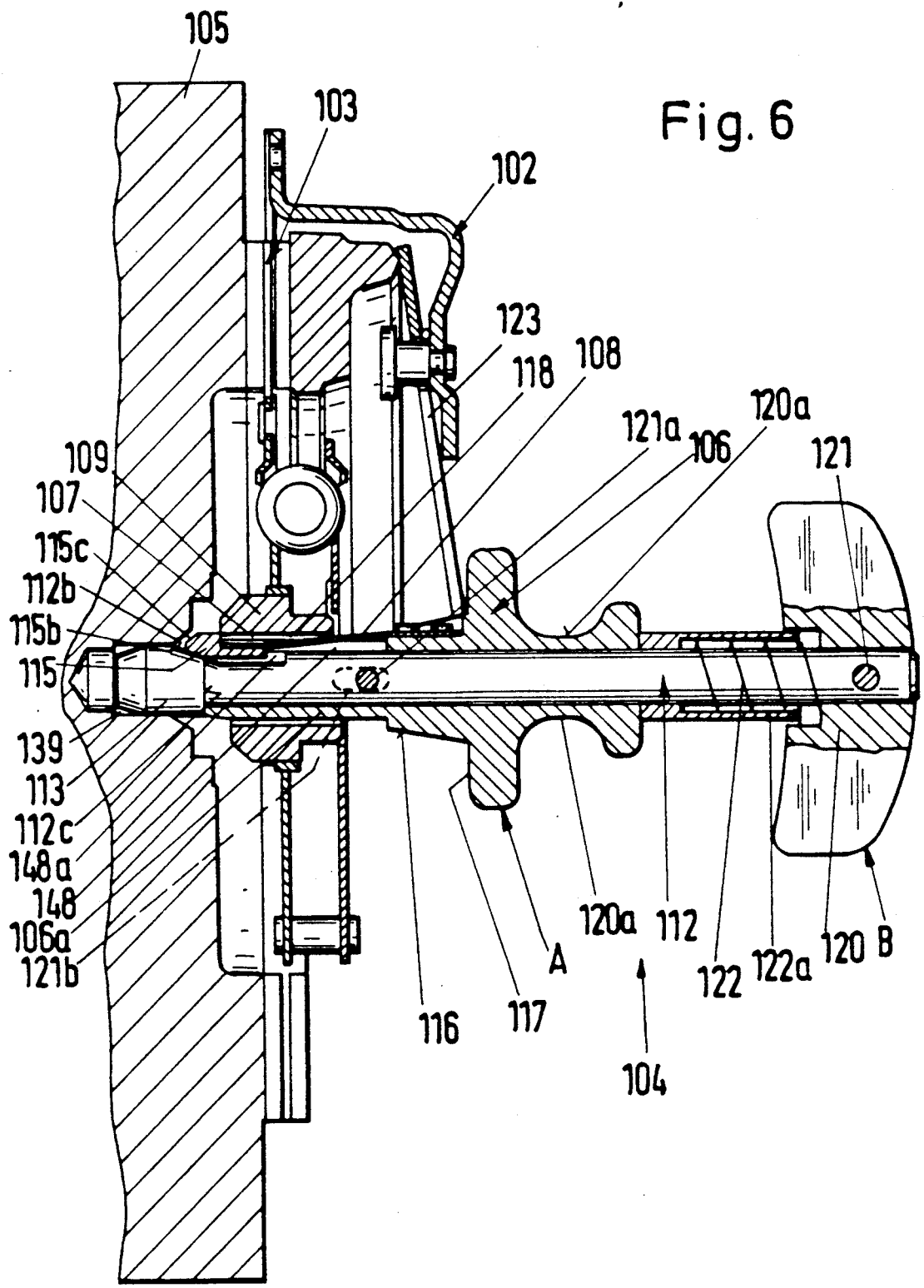

METHOD OF INSTALLING FRICTION CLUTCHES IN MOTOR VEHICLES

BACKGROUND OF THE INVENTION

The invention relates to a method of installing friction clutches in motor vehicles, particularly on the flywheels which are carried by the output shafts of engines for motor vehicles.

In accordance with a heretofore known proposal, the clutch plate and other parts (hereinafter called housing) of a friction clutch are attached to the flywheel on the output shaft of an engine, while the engine is supported on the conveyor or conveyors of the assembly line, by resorting to a centering tool in the form of a mandrel having a profiled portion which is complementary to the hub forming the axially apertured control part of the clutch plate. A front portion of the mandrel extends beyond the hub of the clutch plate and is insertable into a pilot bearing in the crankshaft of the engine. The next step involves withdrawal of a clutch plate from a receptacle and the mounting of the thus withdrawn clutch plate on the mandrel so that the clutch plate surrounds the mandrel behind the front end portion which extends into the pilot bearing of the crankshaft. This centers the clutch plate with reference to the flywheel which is affixed to the crankshaft. The housing and the diaphragm spring therein are then withdrawn from a second receptacle, and such parts of the friction clutch are slipped onto the mandrel so that the housing is adjacent the flywheel. The crankshaft carries centering pins which extend into compelementary bores or holes of the housing before the housing is threadedly connected with the flywheel. The mandrel is withdrawn in the next step while the clutch plate and its hub remain in a position of coaxiality with the pilot bearing. The final step involves attachment of the variablespeed transmission; to this end, the input shaft of the transmission is introduced into the hub of the clutch plate as well as beyond such hub, i.e., into the pilot bearing of the crankshaft.

In accordance with another prior proposal, the front end portion of the centering mandrel is inserted into the pilot bearing of the crankshaft and the entire friction clutch including the clutch plate and the housing with its diaphragm spring and pressure plate is slipped by hand onto the thus positioned mandrel. The next step involves fastening the housing to the crankshaft and to the flywheel on the crankshaft, normally by means of threaded fasteners. In order to facilitate manual placing of the friction clutch onto the centering mandrel, the clutch plate and the housing of the friction clutch are preassembled into a package wherein the clutch plate and the housing (with the diaphragm spring and the pressure plate therein) are properly centered relative to each other. The last step includes extraction of the mandrel from the friction clutch and from the pilot bearing in the crankshaft so that the hub of the clutch plate and the pilot bearing are ready to receive the input element of the variable-speed transmission.

In accordance with still another presently known proposal, the clutch plates and the housings (with the diaphragm springs and pressure plates therein) are withdrawn from discrete receptacles and are placed onto a conveyor belt in such a way that each clutch plate overlies a housing. The thus obtained packages, each of which contains a clutch plate and a housing, are then grasped by hand and slipped onto centering mandrels.

A drawback of heretofore known methods of assembling friction clutches with the output shafts of engines for motor vehicles is that it is difficult to properly hold a clutch plate and a housing (with a pressure plate and a diaphragm spring therein) and to jointly slip such parts onto a centering mandrel. It has been found that the fingers which are used to grasp the parts of the friction clutch are in the way during placing of such parts onto the centering mandrel.

In order to overcome the above discussed drawbacks of heretofore known methods of assembling friction clutches with the output elements of engines in motor vehicles, a further proposal includes assembling successive discrete clutch plates and successive discrete housings (with pressure plates and diaphragm springs therein) on discrete centering cores. The thus obtained subassemblies are stored in a receptacle and are placed, one after the other, onto a conveyor in an assembly line. Each mandrel includes a first centering portion which serves to center the clutch plate with reference to other parts of the friction clutch. The mandrel further includes an end portion which is located at one end of the first centering portion and serves to enter the pilot bearing in the crankshaft of an engine, and the mandrel further includes a second centering portion at the other axial end of the first centering portion to serve as a means for centering the radially inwardly extending prongs of the diaphragm spring in the housing. Still further, the mandrel includes a fourth portion which is used as a handle and is outwardly adjacent the second centering portion. The second centering portion includes a first section which is surrounded by the tips of prongs forming part of the diaphragm spring, and a second section which is adjacent one side of each tip. Still further, the mandrel includes a hook-shaped retaining or holding portion which engages the hub of the clutch plate. The just described mandrel ensures that the clutch plate and the housing (with the pressure plate and diaphragm spring therein) are properly centered relative to each other and can be more conveniently manipulated as a unit. The worker at the assembly line grasps the handle (fourth portion) of the mandrel and inserts the end portion into the pilot bearing to thus center the parts on the mandrel with reference to the flywheel on the crankshaft. Such centering is followed by fastening of the housing to the flywheel and thereupon by extraction of the mandrel. Extraction necessitates the exertion of a certain force in order to disengage the hook-shaped retaining or holding portion from the hub of the clutch plate. The extracted mandrel is discarded or is returned to the manufacturer of friction clutches. A drawback of the just described method is that it contributes significantly to the cost of the power train in which the friction clutch is installed.

OBJECTS OF THE INVENTION

An object of the invention is to provide a novel and improved method of installing a friction clutch in the power train between the engine and the transmission of a motor vehicle.

Another object of the invention is to provide a novel and improved method of mounting the clutch plate and other parts of a friction clutch on the output element of an engine.

A further object of the invention is to provide a novel and improved method of assembling the parts of a friction clutch with a flywheel on the output element of an engine in a motor vehicle.

An additional object of the invention is to provide a novel and improved method of facilitating the assembling and mounting of the constituents of a friction clutch in the power train between an engine and a variable-speed transmission.

Still another object of the invention is to provide a mandrel or core for use in the practice of the above outlined method.

Another object of the invention is to provide a power train which can be assembled with a friction clutch by resorting to the above outlined method.

SUMMARY OF THE INVENTION

The invention resides in the provision of a method of installing an axially apertured rotary clutch plate and a hollow rotary housing of a friction clutch on an axially recessed output element of an internal combustion engine by means of a mounting tool which has an end portion receivable in the axially recessed output element, a first centering portion for the clutch plate and a second centering portion for the housing with the first centering portion disposed between the end portion and the second centering portion. The method comprises the steps of inserting the end portion of the mounting tool through and beyond the housing and thereupon through and beyond the clutch plate to respectively center the clutch plate and the housing on the first and second centering portions of the thus inserted tool so that the clutch plate and the housing are located in or close to predetermined radial and axial positions relative to each other, releasably holding the clutch plate and the housing in or close to predetermined axial positions relative to the tool, introducing the end portion of the tool into the axially recessed output element of the engine, centering the housing and thereupon fastening the housing to the output element, terminating the holding step, and extracting the tool from the output element, clutch plate and housing in such order.

The method can further comprise the step of centering the clutch plate relative to the housing prior to the inserting step, i.e., the clutch plate and the housing can be assembled into a unit prior to introduction of the end portion of the mounting tool first into and through the housing and thereupon into and through the clutch plate.

The output element of the engine is or can be of the type wherein a rotary output shaft (e.g., a crankshaft) carries a coaxial flywheel. The aforementioned centering step then preferably includes centering the housing on the flywheel.

In accordance with a presently preferred embodiment of the method, the holding step includes effecting an angular movement of the clutch plate and the tool relative to each other in a first direction, and the terminating step then includes effecting an angular movement of the clutch plate and the tool relative to each other in a second direction counter to the first direction.

In accordance with another presently preferred embodiment of the method, each of the holding and terminating steps includes effecting a substantially axial movement of a portion at least of the mounting tool with reference to the housing and clutch plate on the tool.

The method can further comprise the step of manipulating the mounting tool by an automaton. If the output element and the housing have complementary centering elements, such method can further comprise the steps of locating the engine and the output element in a first predetermined position, maintaining the output element of the thus located engine in a predetermined angular position, moving the housing to a predetermined angular position in which the centering elements of the housing register with the centering elements of the output element, centering the clutch plate relative to the housing not later than in the course of the moving step, and utilizing the automaton to carry out the inserting step so that the housing is automatically centered on the output element as a result of engagement of centering elements on the output element with registering centering elements of the housing.

The just outlined method can further comprise the step of disengaging the automaton from the mounting tool prior to the fastening step (this facilitates or simplifies fastening of the housing to the output element). The extracting step follows the fastening step and can be carried out by hand.

The apparatus (hereinafter called tool or mounting tool) for installing an axially apertured rotary clutch plate and a hollow rotary housing of a friction clutch on an axially recessed output element of an engine comprises a handle, a shaft having a first end portion which is rotatable by the handle and a second end portion which is insertable through the housing and through the clutch plate prior to introduction into the axially recessed output element, a locating portion provided on the shaft to maintain the housing in or close to a first predetermined axial position, a first centering portion provided on the shaft and receivable in the clutch plate, a second centering portion provided on the shaft and receivable in the housing, and a holding portion which is provided on the shaft intermediate the second end portion and the first centering portion to releasably hold the clutch plate in or close to a second predetermined axial position with reference to the housing while the housing is located in or close to the first predetermined axial position.

The housing comprises or can comprise a diaphragm spring with an annulus of substantially radially inwardly extending prongs. The locating portion serves to abut the prongs of the diaphragm spring, and the second centering portion is surrounded by the prongs in or close to the first predetermined axial position of the housing.

The axial aperture of the clutch plate is or can be defined by an internally splined hub, and the first centering portion on the shaft of the improved tool is then configured to be non-rotatably received in the hub of the clutch plate. The axial recess of the output element can be defined by an annular pilot bearing (e.g., a needle bearing) in the end face of a shaft (e.g., a crankshaft) forming part of or constituting the output element of the engine. The second end portion of the shaft is or can be configured and dimensioned to enter the pilot bearing of the output element.

The second centering portion is or can be located between the locating portion and the first centering portion, and such second centering portion can be provided with a conical peripheral surface which tapers toward the axis of the shaft in a direction from the locating portion toward the first centering portion.

The first centering portion of the tool can comprise at least one external projection (e.g., an axially parallel rib or tooth) which is received in the internal spline of the hub forming part of the clutch plate to prevent rotation of the first centering portion relative to the clutch plate. The holding portion of such tool can be provided with at least one external projection and is preferably rotatable relative to the first centering portion to and from a predetermined angular position in which the projections of the first centering portion and of the holding portion are aligned with each other in the axial direction of the shaft so that the at least one projection of the holding portion can enter the at least one spline in the hub. Such tool can further comprise detent means for releasably retaining the holding portion in the predetermined angular position and/or with detent means for releasably retaining the holding portion in at least one angular position other than the predetermined angular position to thus prevent penetration of the at least one projection of the holding portion into the at least one spline of the hub. Such tool can further comprise means for confining the holding portion to angular movement in a first direction toward the predetermined angular position and to angular movement in a second direction counter to the first direction away from the predetermined angular position.

One side of the hub faces away from the housing on the second centering portion, and the housing can comprise a cover for a diaphragm spring with prongs having tips serving to abut the locating portion and being disposed at a predetermined distance from the aforementioned side of the hub in disengaged condition of the friction clutch. The locating portion is spaced apart from the holding portion a distance which is less than the predetermined distance so that the prongs of the diaphragm spring store energy when the side of the hub abuts the holding portion and the tips of the prongs abut the locating portion of the tool.

The holding portion of the tool can include at least one holding member which is movable radially of the shaft. Such holding member is preferably movable radially of the shaft to and from a position in which the holding portion is free to pass through the axial aperture of the hub. The holding portion can comprise two radially movable holding members which are disposed substantially diametrically opposite each other with reference to the shaft.

The arrangement may be such that the at least one holding member of the holding means is further movable substantially in the axial direction of the shaft. Moreover, the locating portion and the second centering portion of such tool are preferably movable axially of the shaft jointly with the at least one holding member. Means can be provided for securing the handle to the shaft so that the handle and the second end portion of the shaft are located at a fixed distance from each other in the axial direction of the shaft. The locating portion can be rigid with the second centering portion to be movable with the latter in the axial direction of the shaft. Such tool can further comprise means for biasing the locating portion and the second centering portion axially of the shaft toward the second end portion of the shaft. The biasing means can comprise a spring which reacts against the handle or against the shaft and bears against the locating portion and/or against the second centering portion.

The second end portion of the shaft can include means for moving the at least one holding member of the holding portion radially outwardly in response to movement of the at least one holding member axially of the shaft in a direction away from the handle. The moving means of the second end portion can comprise a cam (e.g., at least one ramp), and the at least one holding member preferably comprises a follower which serves to track the at least one ramp. If the second centering portion is movable axially of the shaft, the tool can further comprise means for coupling the second centering portion to the at least one holding member for joint movement in the axial direction of the shaft. The coupling means can comprise at least one leaf spring which extends in substantial parallelism with the axis of the shaft and is preferably prestressed so that it urges the at least one holding member toward the axis of the shaft. The arrangement is preferably such that the at least one leaf spring is receivable in an internal spline of the hub and is movable axially of the shaft relative to the hub.

The novel features which are considered as characteristic of the invention are set forth in particular in the appended claims. The improved method itself, however, together with additional features and advantages thereof, will be best understood upon perusal of the following detailed description of certain presently preferred specific embodiments with reference to the accompanying drawing.

BRIEF DESCRIPTION OF THE DRAWING

FIG. 3 is an enlarged end elevational view of the tool as seen in the direction of arrow III in FIG. 1;

FIG. 4 is an enlarged end elevational view of the first centering portion and holding portion of the tool as seen in the direction of arrow IV in FIG. 1;

FIG. 5 is an enlarged view of a detail of the tool, showing the detent means for releasably retaining the holding portion in a predetermined angular position with reference to the first centering portion of the tool;

FIG. 6 is a view similar to that of FIG. 2 but showing a modified mounting tool while the second end portion of its shaft extends into an axial recess of the output element of the engine;

DESCRIPTION OF PREFERRED EMBODIMENTS

Figure 1:
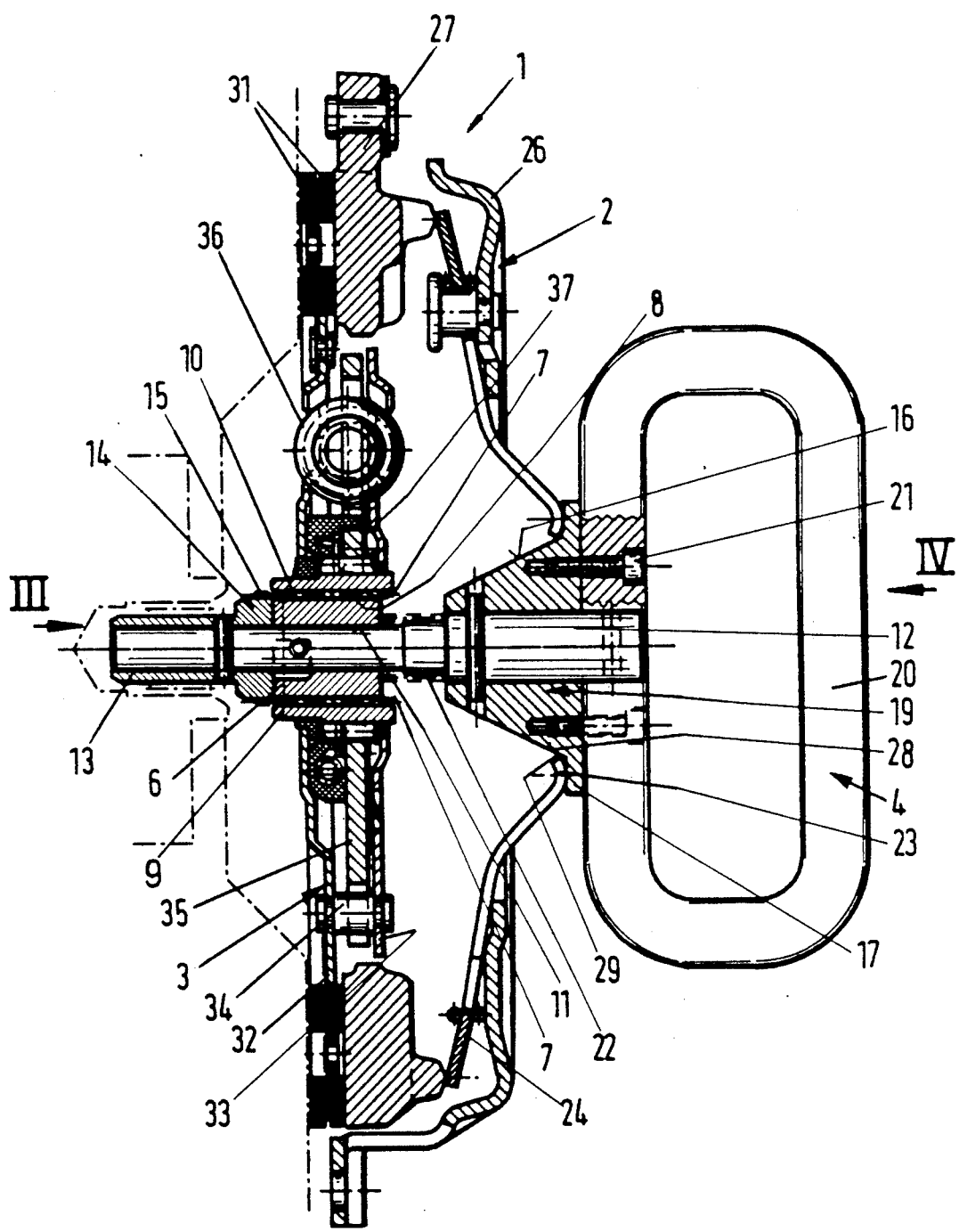
FIG. 1 is a partly elevational and partly axial sectional view of a mounting tool for the practice method of a method which embodies one form of the invention, the clutch plate and the housing of a friction clutch being shown in an axial sectional view and centered on the tool and the output element of an engine being indicated by phantom lines.
Figure 2:
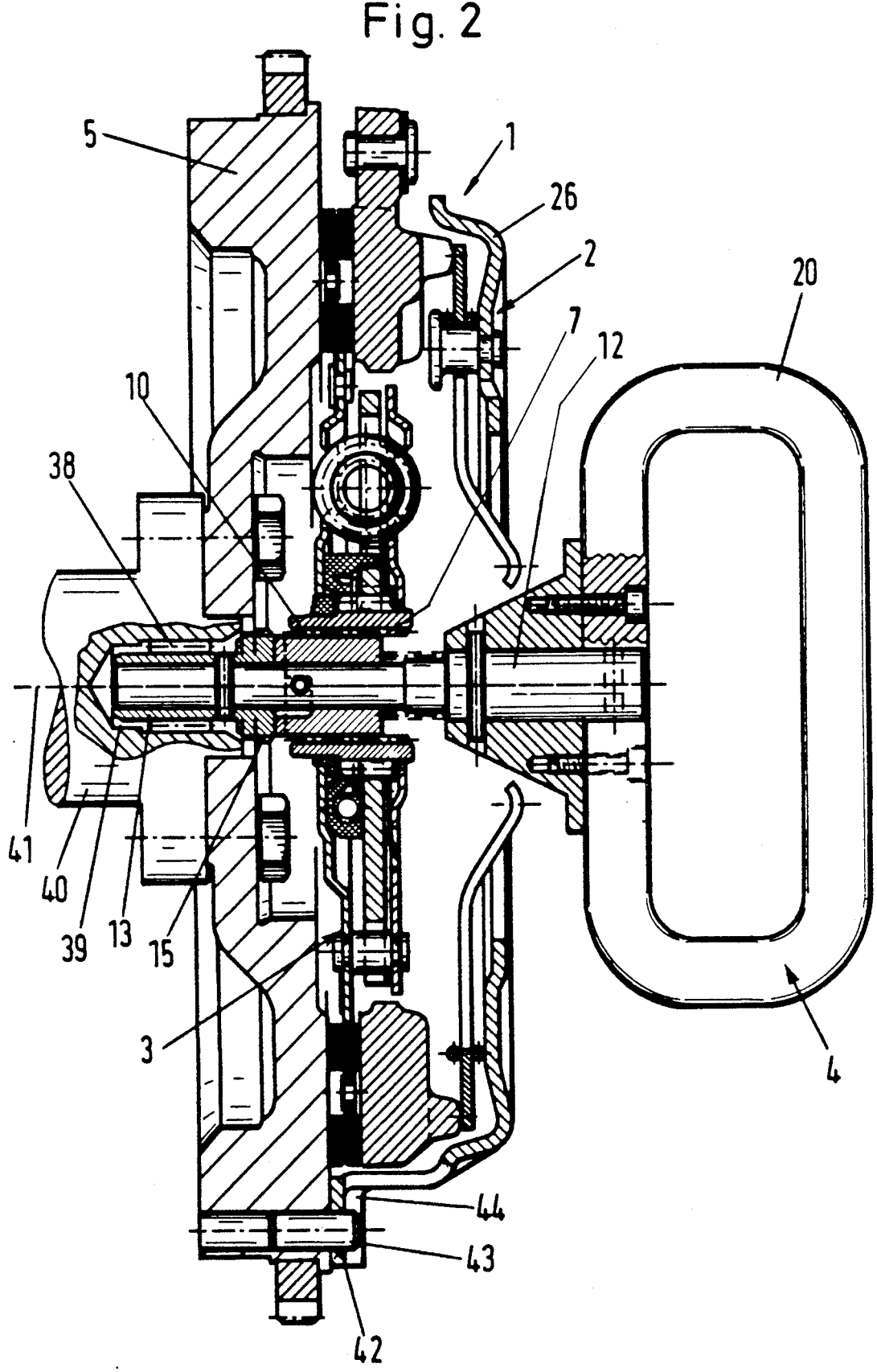
FIG. 2 shows the structure of FIG. 1 but with the output element shown in a partly elevational and partly axial sectional view, the housing of the friction clutch being centered on and being fastened to the flywheel of the output element.

FIGS. 1 and 2 show two separable main parts of a friction clutch 1, namely a rotary clutch plate 3 and a hollow rotary housing 2 including a substantially cupped cover 26 which tiltably supports a diaphragm spring 24 serving to bias an annular pressure plate 27. The diaphragm spring 24 has an annulus of radially inwardly extending elastically deformable prongs 23 having tips which define a centrally located circular opening 29. The housing 2 and the clutch plate 3 are centered by a mounting tool 4 which can be manipulated by hand or by an automaton and serves to separably carry the parts 2, 3 during centering of the housing relative to the flywheel 5 forming part of an output element which further includes a shaft 40, e.g., the crankshaft of an internal combustion engine. The right-hand end face of the shaft 40 has an axial recess 39 for an annular pilot bearing 38 (e.g., a needle bearing) which receives the free end of the input shaft of a variable-speed transmission (not shown) when the power train including the friction clutch 1 is completed.

The clutch plate 3 is preferably centered on the housing 2 prior to introduction of one shaft 12 of the tool 4 so that the parts 2, 3 form a preassembled unit wherein the axial aperture 8 of the hub 9 of the clutch plate 3 registers with the opening 29 within the tips of prongs 23 of the diaphragm spring 24. The tool 4 is inserted into such preassembled unit in the direction of arrow IV (FIG. 1) so that its free end portion 13 first passes through the opening 29 and thereupon through the remainder of the hollow housing 2, thereafter through the internally splined hub 9 of the clutch plate 3 and ultimately into the axial recess 39 of the output shaft 40, i.e., into the annular pilot bearing 38.

The shaft 12 of the tool 4 carries a radially outwardly extending flange-like locating portion 17 for the tips of the prongs 23 of the diaphragm spring 24, a (first) centering portion 6 for the hub 9 of the clutch plate 3, and a (second) centering portion 16 for the housing 2. The substantially trumpet-shaped centering portion 16 is or can be integral with the locating portion 17 and has a conical peripheral surface which tapers toward the axis of the shaft 12 in a direction from a handle 20 toward the end portion 13. The handle 20 is rigid with the respective end portion of the shaft 12; to this end, the handle is screwed (at 21) or bolted to the locating portion 17 and second centering portion 16, and the centering portion 16 is bolted or screwed to the shaft 12. The first centering portion 6 is rotatable on the shaft 12 and is adjacent a holding portion 14. The latter is rotatable with the shaft 12 and is located between the end portion 13 and the adjacent side or end face of the hub 9.

The holding portion 14 is a sleeve which has one or more external projections 15 in the form of axially parallel ribs or teeth (see particularly FIGS. 3, 4 and 5) capable of passing through internal splines 7 of the hub 9. Such splines serve to receive complementary ribs on the input shaft of a variable-speed transmission when the latter is properly assembled with the friction clutch 1. The centering portion 6 is a relatively short cylinder which has a set of external projections 10 in the form of axially parallel ribs or teeth receivable in the splines 7 in the axial aperture 8 of the hub 9. This ensures that the centering portion 6 cannot rotate relative to the hub 9 and vice versa when the centering portion 6 is properly received in the axial aperture 8. The inner diameter of the centering portion 6 closely approximates the diameter of the respective portion of the shaft 12, i.e., the internal surface 11 is or can be a rather snug fit on the external surface of the shaft.

The front end face of the free end portion 13 of the shaft 12 is preferably a conical surface to facilitate introduction of the end portion 13 into the pilot bearing 38. At such time, the projection or projections 15 of the holding portion 14 abut the adjacent side or end face of the hub 9, and the tips 23 of the diaphragm spring 24 abut the locating portion 17 to thus ensure that the clutch plate 3 and the housing 2 are maintained in predetermined axial positions relative to each other and relative to the shaft 12 of the tool 4. The tips of the prongs 23 tend to move axially of the shaft 12 and beyond the positions which are shown in FIG. 1 in a direction toward the handle 20 when the clutch 1 is engaged. The diaphragm spring 24 is preferably stressed when the prongs 23 abut the locating portion 17 and the left-hand side of the hub 9 abuts the projections 15 of the holding portion 14, i.e., the distance of the tips of the prongs 23 from the left-hand side of the hub 9 then does not exceed the distance of the left-hand side of the hub from the locating portion 17.

The sleeve-like centering portion 6 is mounted for axial movement on the adjacent portion of the shaft 12 and is biased toward the holding portion 14 and free end portion 13 by resilient means 22, e.g., a coil spring which reacts against the smaller-diameter end of the centering portion 16 and bears against the adjacent end face of the centering portion 6.

As can be seen in FIGS. 3 and 4, the outer diameter of the holding portion 14 at most matches the inner diameter of the hub 9 so that, when each projection 15 registers with one of the splines 7, the holding portion 14 is free to move axially of and through the hub 9 in a direction toward the position of FIG. 1 or in the opposite direction. The holding portion 14 is non-rotatably secured to the shaft 12 and can be made of one piece with a sleeve which constitutes or forms part of the free end portion 13.

FIGS. 3 and 4 show that the centering portion 6 has four equidistant projections 10 and the holding portion 14 comprises eight equidistant projections 15. The ratio of the number of projections 10 to the number of projections 15 can be altered without departing from the spirit of the invention. For example, the centering portion 6 can comprise a single projection 10 and the holding portion 14 can also comprise a single projection 15. All that counts is to ensure that the projection or projections 10 can hold the properly inserted centering portion 6 against rotation relative to the hub 9 and that the projection or projections 15 of the holding portion 14 can be moved into and from register with a flute 7 or with a corresponding number of flutes in the axial aperture 8 of the hub 9, i.e., that the holding portion 14 can be caused to pass through the hub in at least one first angular position relative to the clutch plate 3 and can be held against penetration into the hub in at least one second angular position relative to the clutch plate.

All parts of the tool 4 may but need not be made of a suitable metallic material. For example, the handle 20 can be made of a plastic material. The locating portion 17 and the centering portion 16 of the illustrated tool 4 together form a one-piece prefabricated unit 19 which is rigid with the shaft 12 as well as with the handle 20. The threaded fasteners 21 which connect the handle 20 with the unit 19 can be replaced with rivets or the like.

FIG. 3 shows the centering portion 6 and the holding portion 14 of the tool 4 in relative angular positions in which each projection 10 is aligned with one of the projections 15 so that the holding portion 14 can be moved into and from the corresponding splines 7 of the hub 9. This is possibly because the mutual spacing of projections 10 in the circumferential direction of the shaft 12 is a whole multiple of the mutual spacing of projections 15. Depending on the total number of splines 7 (which are equidistant from each other in the circumferential direction of the hub 9), the projections 10 may but need not register with projections 15 during insertion of the holding portion 14 into and during axial movement of this holding portion through the hub, i.e., through the axially apertured clutch plate 3.

When the centering portions 6 and 16 of the tool 4 assume the positions which are shown in FIG. 1, the hand grasping the handle 20 turns the shaft 12 with the holding portion 14 relative to the centering portion 6 (which cannot rotate relative to the hub 9 because each of its projections 10 is received in one of the splines 7), so that the projections 15 are moved to the angular positions which are shown in FIG. 4, i.e., the projections 15 then abut the respective side of the hub 9 and the portion 14 releasably holds the clutch plate 3 and the housing 2 against movement from the axial positions which are shown in FIG. 1. At the same time, the centering portions 6 and 16 respectively maintain the clutch plate 3 and the housing 2 in predetermined radial positions with reference to the shaft 12. In order to ensure that the projections 15 of the holding portion 14 can assume positions in which they are clearly out of register with the splines 7 in the hub 9, it is advisable or recommended to turn the handle 20 and the shaft 12 through an angle (25 in FIG. 4) which equals the mutual spacing of two neighboring flutes 7 or a multiple of such mutual spacing plus half of the spacing, i.e., each projection 10 can be disposed midway between two neighboring projections 15.

The cover 26 of the housing 2 carries rivets or other suitable means for tiltably mounting the radially outer portion of the diaphragm spring 24 between two ring-shaped wire-like or analogous seats so that the radially outermost portion of the diaphragm spring bears against axially parallel protuberances of the pressure plate 27. The latter is axially movably but non-rotatably coupled to the cover 26 by leaf springs in the customary way. FIG. 1 shows the diaphragm spring 24 in nearly fully relaxed (unstressed) condition. The tips of the prongs 23 of the diaphragm spring 24 are then adjacent the maximum-diameter (centering) zone 28 of the conical peripheral surface of the centering portion 16 for the housing 2. The centering portion 16 is surrounded by the tips of the prongs 23, and such tips abut the locating portion 17. The frustoconical centering portion 16 can be replaced with a cylindrical or substantially cylindrical portion without departing from the spirit of the invention; for example, the zone 28 can constitute or resemble a cylindrical surface.

The clutch plate 3 carries friction linings 31 which are clamped between the pressure plate 27 and the flywheel 5 when the clutch 1 is engaged. The friction linings 31 are mounted on the radially outermost portion of a substantially disc-shaped carrier 32 which is rigidly connected with a second-disc-shaped carrier 33 by distancing elements 34 in the form of rivets or the like. The clutch plate 3 further comprises an annular flange 35 which is disposed between the carriers 32, 33 and is rigid with the hub 9. The carriers 32, 33 are provided with first sets of registering windows and the flange 35 is provided with a second set of windows each of which is in at least partial register with a first set of windows to receive portions of coil springs 36 or other suitable energy storing elements which form part of an elastic damper between the friction linings 31 and the hub 9. In addition, the clutch plate 3 preferably comprises one or more washer-like or analogous friction generating elements (one shown at 37) which are interposed between the flange 35 and at least one of the carriers 32, 33 to further reduce the likelihood of transmission of shocks from the flywheel 5 to the hub 9 and hence to the input shaft of a variable-speed transmission which receives torque from the engine by way of the friction clutch 1.

As mentioned above, the diaphragm spring 24 is at least slightly stressed when the clutch plate 3 and the housing 2 are assembled in a manner as shown in FIG. 1. This is due to the fact that the distance of the left-hand side of the hub 9 (as seen in FIG. 1 or 2) from the locating portion 17 is less than the maximum possible distance of the left-hand side of the hub from the tips of prongs 23 in unstressed condition of the diaphragm spring 24. Such slight axial stressing of the diaphragm spring 24 ensures that the clutch plate 3 and the housing 2 are maintained in optimum axial positions relative to each other and relative to the shaft 12 during insertion of the free end portion 13 of the shaft into the pilot bearing 38 and during subsequent centering of the housing 2 on the flywheel 5 prior to final fastening of the housing to the flywheel It is also possible to employ discrete biasing means (other than the diaphragm spring 24) to urge the left-hand side of the hub 9 against the projections 15 of the holding portion 14 and to simultaneously urge the tips of the prongs 23 against the adjacent side of the locating portion 17.

The dimensions of the free end portion 13 of the shaft 12 are preferably selected in such a way that the housing 2 is automatically centered with respect to the flywheel 5 when the end portion 13 extends into the annular pilot bearing 38 in the recess 39 of the output shaft 40 of the engine. In addition, the cover 26 and the flywheel 5 can be provided with complementary centering elements 42, 43 (shown in the lower portion of FIG. 2) in order to ensure that the housing 2 remains properly centered with respect to the composite output element 5, 40 of the engine during fastening (e.g., by threaded fasteners) of the cover 26 to the flywheel 5. The axis 41 of the shaft 40 then coincides with the axis of the shaft 12, i.e., with the common axis of the centering portions 6, 16, locating portion 17 and holding portion 14.

The centering elements 42 of the housing 2 are holes or slots which are provided in the radially outermost marginal portion of the cover 26, and the centering elements 43 are pins or studs which enter the adjacent slots or holes 42 when the housing 2 assumes a predetermined angular position with reference to the flywheel 5. As the housing 2 approaches the flywheel 5, the studs or pins 43 enter the registering slots or holes 42 to thus center the cover 26 relative to the flywheel 5 and shaft 40 as well as to maintain the housing 2 in a predetermined angular position (or in one of two or more predetermined angular positions) with reference to the output shaft 40.

The fasteners which secure the cover 26 to the flywheel 5 in assembled condition of the power train can constitute screws which alternate with the studs or pins 43 of the flywheel. The openings or slots for the fasteners are provided in the marginal portion 44 of the cover 26 and register with tapped bores in the flywheel 5. When the fastening of the cover 26 to the flywheel 5 is completed, the parts of the clutch 1 assume the positions which are shown in FIG. 2.

The tool 4 is detached from the output element 5, 40 and from the properly installed friction clutch 1 as soon as the fastening of the cover 26 to the flywheel 5 is completed. To this end, the handle 20 is turned with the shaft 12 and with the holding portion 14 which latter changes its angular position relative to the centering portion 6 (for example, by moving from the angular position of FIG. 4 back to the angular position of FIG. 3) so that the projections 15 register with the adjacent splines 7 and the holding portion 14 is ready to be pulled through the axial aperture 8 of the hub 9 and thereupon through the opening 29. The free end portion 13 of the shaft 12 trails the holding portion 14 on its way toward and through the clutch plate 3 and thereupon through and beyond the housing 2.

The extracted tool 4 is ready to be put to next use, i.e., for centering and axial positioning of parts 2, 3 of the next clutch 1 which is to be centered on and affixed to the flywheel 5 in the aforedescribed manner.

FIG. 5 shows one form of detent means (45) which can be used in the tool 4 to releasably hold or retain the centering portion 6 and the holding portion 14 in at least one predetermined angular position relative to each other, namely in a position in which the projections 15 of the holding portion 14 cannot enter the splines 7 of the hub 9. In FIG. 5 the angular positions of the projections 15 relative to the projections 10 correspond to those shown in FIG. 4. The detent means 45 comprises at least one axial protuberance or lobe 46 which is provided on the centering portion 6 and is received in a complementary socket 47 of the holding portion 14. The surfaces 48 bounding the socket 47 are cam faces which are tracked by the peripheral surface of the suitably rounded protuberance 46. The spring 22 yields when the shaft 12 is caused to turn the holding portion 14 relative to the centering portion 6 (while the latter is non-rotatably received in the hub 9) in a direction (e.g., clockwise) to expel the protuberance 46 from the socket 47, and the spring 22 is free to dissipate energy after the shaft 12 is turned in the opposite direction to reintroduce the protuberance 46 into the socket 47. The initial stressing of the spring 22 (i.e., the stressing when the protuberance 46 is received in the socket 47) suffices to ensure that the angular position of the shaft 12 and holding portion 14 with reference to the centering portion 6 cannot be accidentally changed.

The tool 4 preferably comprises at least one additional detent means (including the socket 49 shown in the upper portion of FIG. 5) for releasably retaining the holding portion 14 in at least one second angular position with reference to the centering portion 6, namely in an angular position in which the projections 15 are aligned with splines 7 preparatory to introduction of the holding portion 14 into the aperture 8 of the hub 9. The arrangement is such that the shaft 12 must be turned through the angle 25 in order to move the protuberance 46 from the socket 47 into the socket 49 or vice versa. Furthermore, the arrangement is or can be such that the handle 20 must be turned with reference to the centering portion 6 in the hub 9 in a first direction in order to move the protuberance 46 into register with the socket 47 and in a second (opposite) direction in order to move the protuberance into register with the socket 49.

The handle 20 can be used in addition to or in lieu of an automaton (not shown) which is then used to manipulate the tool 4 relative to and/or with the parts of the friction clutch 1 and/or relative to the output element 5, 40 of the engine. The tool 4 is then provided with suitably coupling means (e.g., a mandrel or core) for introduction into the arm of a robot. The utilization of an automaton results in additional shortening of the interval which elapses to properly position the clutch plate 3 and the housing 2 relative to each other and to introduce the end portion 13 of the shaft 12 into the pilot bearing 38 preparatory to affixing of the cover 26 to the flywheel 5. The automaton can be detached from the tool 4 during fastening of the cover 26 to the flywheel 5 if the configuration and/or dimensions of the automaton are such that the latter could interfere with rapid fastening of the cover 26 to the flywheel 5.

If an automaton is used to manipulate the tool 4, the engine is preferably moved to a predetermined position, e.g., on an assembly conveyor, so that the output element including the shaft 40 and the flywheel 5 is maintained in an optimum orientation and in an optimum angular position. The housing 2 is also maintained in a predetermined orientation and in a predetermined angular position prior to or subsequent to mounting on the tool 4 to thus ensure that the centering pins 43 automatically enter the bores or slots 42 when the end portion 13 of the shaft 12 is introduced into the recess 39, i.e., into the pilot bearing 38.

The holding portion 6 can include or can be replaced with magnetic or electromagnetic means for releasably holding the clutch plate 3 and the housing 2 in desired axial and radial positions relative to each other and relative to the shaft 12 during introduction of free end portion 13 into the pilot bearing 38 and during subsequent centering of the cover 26 on and its fastening to the flywheel 5. Furthermore, electromagnetic or magnetic means can be provided to center the clutch plate 3 on the housing 2 prior to introduction of the end portion 13 of the shaft 12 from the exposed side of the housing first through the opening 29 and thereupon through and beyond the aperture 8 of the hub 9.

Figure 8:
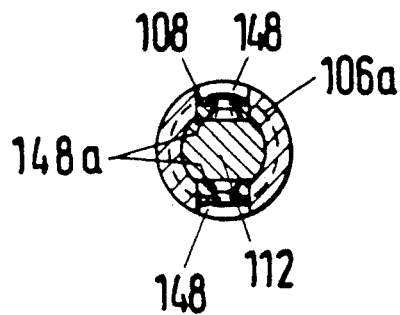
FIG. 8 is a sectional view substantially as seen in the direction of arrows from the line VIII—VIII of FIG. 7.
Figure 7:
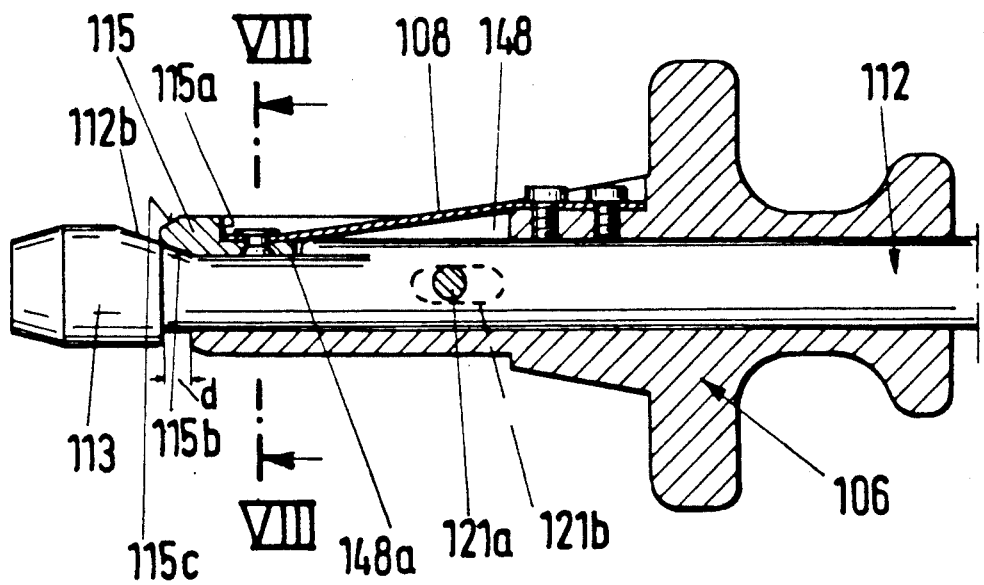
FIG. 7 is an enlarged view of the left-hand part of the tool which is shown in FIG. 6.

FIGS. 6 to 8 show a modified mounting tool 104 which comprises two components or units A and B. These units or components are movable relative to each other in the axial direction of the shaft 112 in order to facilitate assembly of the clutch plate 103 with the housing 102 of the friction clutch as well as to facilitate extraction of the tool 4 from the clutch upon completed fastening of the cover of the housing 102 to the flywheel 105 of the output element of the engine.

The unit or component B comprises a handle 120 which is secured to the shaft 112 by a diametrically extending pin 121 or by other suitable securing means. That end portion 113 of the shaft 112 which is remote from the handle 120 resembles a boss receivable in an axial recess 139 of the flywheel 105. The diameter of the end portion 113 exceeds the diameter of the major portion of the shaft 112. The axial recess 139 of the flywheel 105 can be enlarged to provide room for an annular pilot bearing (corresponding to the bearing 38 in FIGS. 1 and 2) which axially movably receives the end portion 113 during attachment of the housing 102 to the flywheel 105.

The unit A of the tool 104 comprises a manually operable sleeve-like centering portion 106a forming part of an elongated tubular member 106 which surrounds and is slidable along the shaft 112. The member 106 has a circumferentially extending groove 120a or a set of discrete notches for reception of certain fingers of one hand which holds the member 106 preparatory to moving it axially of the shaft 112. A helical spring 122 is installed between the handle 120 and the member 106 to oppose axial movements of this member in a direction away from the end portion 113. A sleeve-like shroud 122a surrounds and confines the spring 122 between the tubular member 106 and the handle 120.

The member 106 comprises the aforementioned centering portion 106a for the hub 109 of the clutch plate 103, a slightly frustoconical or trumpet-shaped centering portion 116 for tips of prongs 123 of the diaphragm spring in the cover of the housing 102, and a radially extending flange- or collar-like locating portion 117 serving as an axial abutment for the tips of the prongs 123. Thus, the portions 116, 117 can properly locate the housing 102 in the axial direction as well as properly center the housing in the radial direction of the shaft 112.

The teeth which alternate with the internal splines 107 of the hub 109 can actually abut the external surface of the centering portion 106a of the unit A.

The holding portion of the tool 104 comprises one or more holding members 115 which are movable radially as well as axially of the shaft 112 and are radially movably coupled to the unit A (and more specifically to the centering portion 116 of the tubular member 106) by elongated leaf springs 108. The springs 108 extend in the axial direction of the shaft 112 and are stressed to urge the respective holding members 115 radially inwardly toward the axis of the shaft 112. The tubular or sleeve-like centering portion 106a is provided with axially parallel grooves 148, and the shaft 112 is provided with axially extending grooves 148a for the leaf springs 108 and the holding members 115. The grooves 148a are deeper in the region of the holding members 115, and the length of each of these grooves at least equals the axial length of the respective holding member 115 plus the extent of movability of the units A and B relative to each other in the axial direction of the shaft 112. The extent of such movability is or can be determined by the length of a closed slot 121b which is provided in the shaft 112 and receives a pin 121a of the unit A. When the holding members 115 extend into the respective grooves 148a, they do not interfere with axial movements of the units A and B relative to each other through a maximum possible distance (determined by the length of the slot 121b and the diameter of the pin 121a therein).

The holding members 115 are provided with radially extending shoulders 115a which face toward the centering portion 116 and can engage the left-hand side or end face of the hub 109 to prevent extraction of the centering portion 106a from the hub. Each holding member 115 further comprises a follower 115c with an inclined internal surface 115b arranged to ride along a ramp or cam 112b of the end portion 113 when the tubular member 106 is moved axially of the shaft 112 toward the end portion 1131 This moves the shoulder 115c radially outwardly against the opposition of the respective leaf spring 108 so that the shoulder 115c is moved against or adjacent the left-hand side of the hub 109. The follower 115c of each radially movable holding member 115 is further provided with a second inclined surface opposite the inclined surface 115b to facilitate introduction of the holding member into the hub 109 in a direction from the interior of the follow housing 102 toward and beyond the left-hand side of the hub.

When the tubular member 106 is moved axially of the shaft 112 toward the handle 120, the followers 115c of the holding members 115 are compelled to move radially toward the axis of the shaft by sliding along the ramp 112b of the end portion 113 under the bias of the leaf springs 108. The radially inward movement of the holding members 115 is terminated when they reach the surfaces in the deepmost portions of the respective grooves 148a. When the operator releases the tubular member 106, the spring 122 is free to dissipate energy and shifts the tubular member 106 toward the end portion 113 of the shaft 112. This causes the inner surfaces 115b of the holding members 115 to slide along the ramp 112b and to move radially of and away from the axis of the shaft 112. It goes without saying that the bias of the spring 122 should suffice to ensure that the leaf springs 108 yield and enable the holding members 115 to move radially outwardly as soon as the tubular member 106 is released by the hand of an operator while the member 106 is located at a minimum distance from the handle 120.

The end portion 113 of the shaft 112 is provided with an annular shoulder 112c which serves as an abutment for the centering portion 106a. Thus, the shoulder 112c limits the extent of axial movement of the tubular member 106 in a direction away from the handle 120 and determines the radially outermost positions of the holding members 115. The aforementioned slot 121b and pin 121a not only serve to limit the extent of axial movability of the units A and B relative to each other but they also serve as a means for preventing rotation of the unit A relative to the unit B or vice versa.

When the housing 102 is properly centered on and is fastened to the flywheel 105, the unit B is depressed to move the end portion 113 a little deeper into the recess 139 against the opposition of the coil spring 122 so that the unit B is shifted relative to the unit A and the leaf springs 108 urge the respective holding members 115 first against the ramp 112b and thereupon into the respective grooves 148a to thus ensure that the end portion 113 can be extracted from the recess 139, thereupon into and through the hub 109 and ultimately through and beyond the housing 102. In other words, the leaf springs 108 ensure that the shoulders 115a are located radially inwardly of the hub 109 and are ready to enter the axial aperture of the hub on their way toward and into the interior of the hollow housing 102. The distance d which the unit B should cover relative to the unit A in order to effect a radially inward movement of the shoulders 115a beyond the left-hand end face of the hub 109 can be in the range of 3-10 mm, preferably 4-6 mm.

In order to mount the housing 102 and the clutch plate 103 on the tool 104, the end portion 113 of the shaft 112 is introduced (from the right, as seen in FIG. 6) first into the housing 102 and thereupon into, through and beyond the hub 109 of the clutch plate. The tubular member 106 is moved axially of the shaft 112 to stress the spring 122 prior to or during entry of the end portion 113 into the hub 109. This enables the holding members 115 to move radially inwardly into the grooves 148a because they are permanently biased by the respective leaf springs 108. Thus, the holding members 115 can enter the axial aperture of the hub 109 and can advance beyond the aperture in order to be free to move radially outwardly and to place the shoulders 115a against the left-hand side of the hub. Such radially outward movement of the holding members 115 relative to the shaft 112 takes place in automatic response to relaxation of axial force upon the tubular member 106, i.e., as soon as the spring 122 is free to expand and to move the followers 115c of the holding members 115 along the ramp 112b of the end portion 113. This completes the radial and axial positioning of the clutch plate 103 and housing 102 on the tool 104.

The next step involves introduction of the end portion 113 into the recess 139 of the flywheel 105 (or into a pilot bearing in the recess 139). This ensures that the housing 102 is properly centered relative to the flywheel 105 preparatory to being fastened thereto. The last step involves extraction of the tool 104 following a radially inward movement of the holding members 115 into the respective grooves 148a so that the shoulders 115a can enter the axial aperture of the hub 109.

It is clear that the tool can be modified in a number of additional ways. Furthermore, certain features of the tool 4 can be embodied in the tool 104 and vice versa. Moreover, the tool 4 or 104 can be used for centering, axial positioning and affixing of friction clutches which depart from those shown in FIGS. 1-2 or in FIG. 6. The tool 104 can also embody means for attachment to an automaton. Many additional modifications within the spirit of the invention will readily occur to those skilled in the art.

As shown in FIG. 8, the holding means of the tool 104 can comprise two holding members 115 which are disposed diametrically opposite each other with reference to the shaft 112. However, it is equally possible to use a single holding member 115 or three or more preferably equidistant holding members. The leaf springs 108 act not unlike hinges which enable the holding members 115 to move radially of the shaft 112 while simultaneously coupling the holding members to the tubular member 106.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of installing an axially apertured rotary clutch plate and a hollow rotary housing of a friction clutch on an axially recessed output element of an engine by means of a mounting tool which has an end portion receivable in the axially recessed output element, a first centering portion for the clutch plate and a second centering portion for the housing with the first centering portion disposed between the end portion and the second centering portion, comprising the steps of centering the clutch plate relative to the housing; thereafter inserting the end portion of the tool through and beyond the housing and thereupon through and beyond the clutch plate to respectively center the clutch plate and the housing on the first and second centering portions in or close to predetermined radial and axial positions relative to each other; thereupon releasably holding the clutch plate and the housing in or close to predetermined axial positions relative to the tool; thereafter introducing the end portion of the tool into the axially recessed output element; thereupon centering the housing on and thereupon fastening the housing to the output element; thereafter terminating said holding step; and thereafter extracting the tool from the output element, clutch plate and housing in such order.

2. The method of claim 1, wherein a rotary output shaft of the output element carries a coaxial flywheel of the output element, said centering step including centering the housing on the flywheel.

3. The method of claim 1, wherein said holding step includes effecting an angular movement of the clutch plate and the tool relative to each other in a first direction and said terminating step includes effecting an angular movement of the clutch plate and the tool relative to each other in a second direction counter to said first direction.

4. The method of claim 1, wherein each of said holding and terminating steps includes effecting a substantially axial movement of at least a portion of the mounting tool.

5. The method of claim 1, further comprising the step of manipulating the mounting tool by an automaton.

6. The method of claim 5, wherein the output element and the housing have complementary centering elements and further comprising the steps of locating the engine and the output element in a first predetermined position, maintaining the output element of the thus located engine in a predetermined angular position, moving the housing to a predetermined angular position in which the centering elements of the housing register with the centering elements of the output element, centering the clutch plate relative to the housing not later than in the course of the moving step, and utilizing the automaton to carry out said inserting step so that, during said initiating step, the housing is automatically centered on the output element as a result of engagement of centering elements on the output element with registering centering elements of the housing.

7. The method of claim 6, further comprising the step of disengaging the automaton from the tool prior to said fastening step, said extracting step following said fastening step.

* * * * *